(12) United States Patent
Sandstrom

(10) Patent No.: US 6,697,373 B1
(45) Date of Patent: Feb. 24, 2004

(54) AUTOMATIC METHOD FOR DYNAMICALLY MATCHING THE CAPACITIES OF CONNECTIONS IN A SDH/SONET NETWORK COMBINED WITH FAIR SHARING OF NETWORK RESOURCES

(76) Inventor: Mark Henrik Sandstrom, 40640 High St. Apt. 404, Fremont, CA (US) 94538

( * ) Notice: Subject to any disclaimer, the term of this patent is extended or adjusted under 35 U.S.C. 154(b) by 0 days.

(21) Appl. No.: 09/484,083

(22) Filed: Jan. 18, 2000

(51) Int. Cl.[7] ............................................... H04L 12/28
(52) U.S. Cl. ...................... 370/405; 370/404; 370/401; 370/403; 370/907
(58) Field of Search ................................ 370/352, 355, 370/393, 400–404, 425, 460, 466, 493, 222–224, 405

(56) References Cited

U.S. PATENT DOCUMENTS

| | | | |
|---|---|---|---|
| 5,987,026 A | * 11/1999 | Holland | 370/353 |
| 6,137,800 A | * 10/2000 | Wiley et al. | 370/395.51 |
| 6,256,292 B1 | * 7/2001 | Ellis et al. | 370/227 |
| 6,359,859 B1 | * 3/2002 | Brolin et al. | 370/218 |
| 6,370,145 B1 | * 4/2002 | Dally et al. | 370/400 |
| 6,389,030 B1 | * 5/2002 | Coden | 370/404 |
| 6,442,134 B1 | * 8/2002 | Mitchell | 370/223 |
| 6,496,519 B1 | * 12/2002 | Russell et al. | 370/465 |
| 6,535,529 B1 | * 3/2003 | Ichihashi | 370/535 |

* cited by examiner

Primary Examiner—Douglas Olms
Assistant Examiner—Van Nguyen
(74) Attorney, Agent, or Firm—Michael R. Cammarata; Irene H. Fernandez

(57) ABSTRACT

A method described in this document enables building a (logical) SDH/SONET ring where the connections between the packet-switched Access Interfaces of the SDH/SONET ring are automatically and dynamically (at 1 ms time-scale) arranged based on the actual volumes of the packet traffic flows between the Access Interfaces of the SDH/SONET ring and fair sharing of network resources. Traffic prioritizing is possible within the Access Interface to Access Interface traffic flows. No packets are lost in the SDH/SONET ring, unless temporarily in case of line or equipment failure.

10 Claims, 5 Drawing Sheets

AUTOMATIC METHOD FOR DYNAMICALLY MATCHING THE CAPACITIES OF CONNECTIONS IN A SDH/SONET NETWORK COMBINED WITH FAIR SHARING OF NETWORK RESOURCES

FIELD OF INVENTION

This invention relates to the field of networking, particularly to methods of optimizing the capacities of connections in SDH/SONET networks for packet-based traffic.

BACKGROUND OF INVENTION

For convenience of reference, the following acronyms are used and referred to herein as follow:

| List of Common Acronyms | |
|---|---|
| ADM | (SDH/SONET) Add-Drop Multiplexer |
| ATM | Asynchronous Transfer Mode |
| FR | Frame Relay |
| HDLC | High Level Data Link Communication |
| IP | Internet Protocol |
| POS | Packet-Over-SONET; used here as to refer any cell/frame/packet based data transmission over SDH/SONET |
| SDH | Synchronous Digital Hierarchy |
| SONET | Synchronous Optical Network |
| TDM | Time-Division Multiplexing |

The Open Systems Interconnection (OSI) model by International Organization for Standardization (ISO) is used herein as the reference for protocol layering.

Communication networks and protocols can be generally categorized into two basic types: connection oriented ones and connectionless ones. Connection oriented communication uses an established connection (such as physical circuit) between the communicating end points, and the data is (continuously) transmitted using the capacity reserved for the connection. A number of these connections, also called as channels, can be carried in a single physical wire using a technique called Time-Division Multiplexing, TDM. Connection oriented communication and TDM are commonly used for telephone traffic. The latest development in TDM technology is the Synchronous Digital Hierarchy, SDH. Somewhat simpler version of SDH used in North America is called the Synchronous Optical Network, SONET. Data communication, typically communication between computers, on the other hand, uses mainly connectionless approach. Such connectionless communication is accomplished by the transmitting the data in distinct asynchronous blocks, called packets, between the end points of communication, and such connectionless networking is thus called packet-switched. The dominating protocol in packet-switched networking currently is the Internet Protocol, IP.

It is forecasted that most of the growth in communication volumes will be in (IP-based) data traffic rather than in TDM (voice) traffic. As SDH/SONET is a connection-based (Layer 1) protocol that was mainly developed for TDM traffic and that uses operator-provisioned connections of constant bit-rate, without a method of dynamically modifying SDH/SONET connections, it is non-optimal for variable bit rate packet traffic. However, SDH/SONET is currently the dominant high-speed backbone transport network technology, and has a number of advantages including its synchronous nature, and standardized network management and traffic protection mechanisms. These advanced features of SDH/SONET equipment and networks make it more reliable data transmission technology compared to the packet-switched LAN technologies. It would also be desirable to have a common network that is efficient both for data and telecommunications.

Conventionally the connections in TDM-based networks including SDH/SONET networks are provisioned by the network operator. This makes TDM connections rather rigid and thus the trend currently is to use as few and simple (high-capacity) connections as possible to carry packet traffic between the packet switches and routers. Accordingly, conventional POS solutions use SDH/SONET connections as plain links between the adjacent switches or routers in the network, so that in conjunction with SDH/SONET ADMs that have packet-switched access interfaces there needs to be a packet switch that needs to route and process all the packet traffic from also the ring interfaces of the ADM, though typically majority of the packet traffic on backbone SDH/SONET rings are passed from one ring interface of the ADM to another. It is common that the ADMs and the packet switches required in conjunction with them are separate network elements. It is clear that this kind of network architecture is non-optimal. Particular problems are that the network throughput degrades and the delays increase in case of congestion, as a consequence of one or more of the packet switches in the network becoming overloaded. Routing traffic on packet-by-packet basis is also much more complicated and causes more delay even under normal network load than connecting packet flows as regular TDM channels between the interfaces of the network elements.

As long as TDM (SDH/SONET) connections are operator provisioned (semi-permanent), i.e. as long as there is no method for dynamically forming and adjusting the capacity of TDM (SDH/SONET) connections, the network elements that route packet traffic must perform packet switching for their entire packet traffic interface capacity to use the bandwidth efficiently. Because the units of transmission in common datacom protocols such as IP and FR are of variable size, they often need to be chopped to fixed size blocks, usually ATM cells, to facilitate line rate routing/forwarding at transport networks. ATM however is a connection-oriented (Layer 2) protocol that requires the connections to be established before traffic can be served, making it non-transparent for traffic that is not originally ATM traffic. IP for example is connectionless (Layer 3) protocol, and the networks serving IP traffic should appear as transparent for the communicating applications. Furthermore, use of ATM causes additional overhead degrading transmission efficiency and requires dedicated processing equipment and resources.

For the above reasons, there is a clear need for methods that enable more efficient, flexible and dynamic use of SDH/SONET connections for variable bandwidth data traffic. There is therefore a need for an efficient solution for carrying variable bandwidth packet traffic over simple SDH/SONET rings.

SUMMARY OF INVENTION

The present invention enables dynamic adjustment of the capacity of SDH/SONET connections by automatically adding and removing Paths to/from the connections formed of virtual-concatenated Paths based on the actual volumes of the packet traffic flows between the access interfaces of the SDH/SONET network and fair sharing of network resources.

The present invention provides a method to combine, without compromising, the reliability and predictability of SDH/SONET with the efficiency and flexibility of packet traffic. The packet traffic here refers to any form of digital communication where the data is transmitted in distinct asynchronous blocks (cells, frames or packets) that have a forwarding identifier with them. The method enables building of cost-efficient integrated routing and transport networks and facilitates true convergence of data communications and telecommunications.

BRIEF DESCRIPTION OF DRAWINGS

Signals flows shown in the figures are to be considered as two-directional (i.e. implemented for instance with a pair of physical fibers) when no direction is shown.

DETAILED DESCRIPTION OF PREFERRED EMBODIMENT(S)

Figure 1:
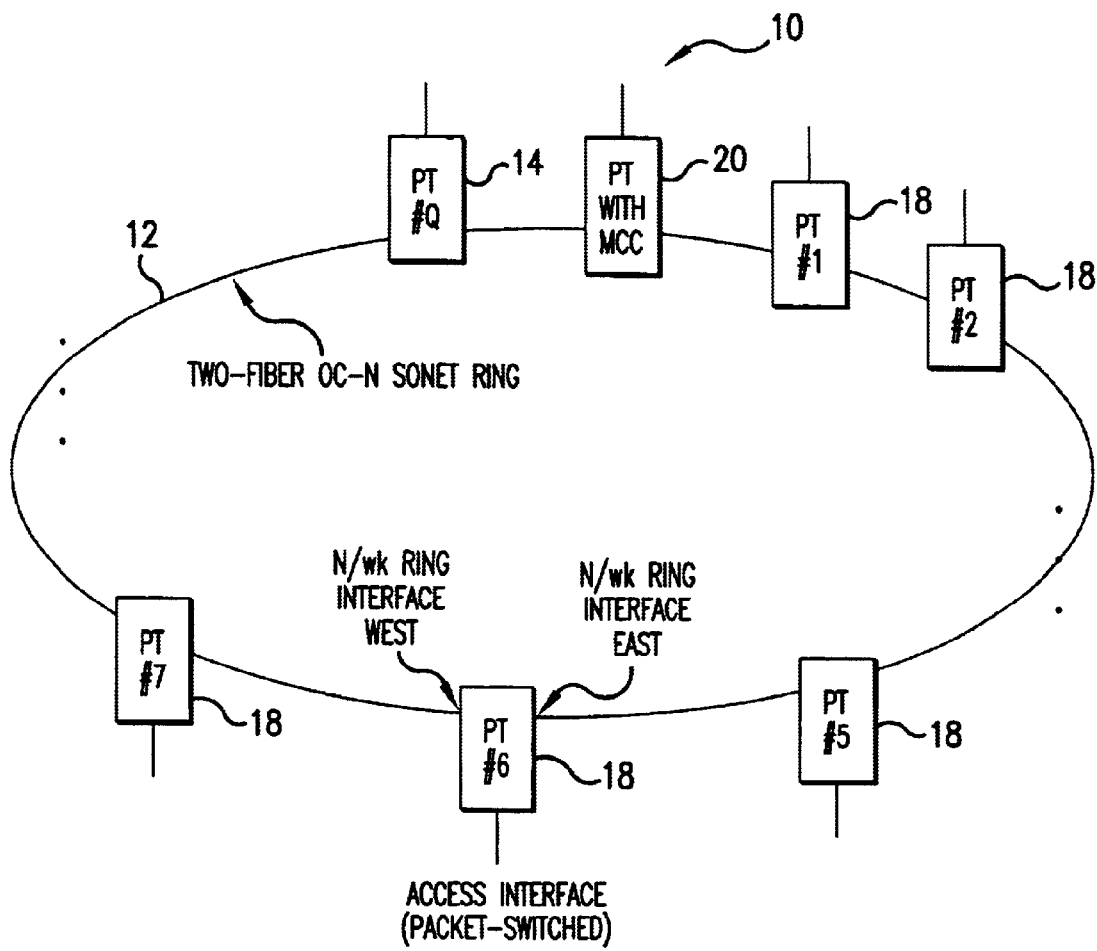
FIG. 1 illustrates a generalized network diagram of an SDH/SONET ring (referred herein as a N/wk Ring) connecting a number of Packet Terminals, in accordance with the principles of this invention.

The method provided in accordance with the principles of this invention applies for both SDH and SONET, as well as for emerging standards based on these, though for convenience only SONET terms are mostly used in the description of the invention. The method can be implemented using any kind of SDH/SONET Paths though only STS-1 Paths are discussed (as an example) in this document. (An STS-1 Path is in SDH terms an S3 trail, a VC-3 aligned via AU-3.)

For convenience, the following acronyms and terms are used herein:

| | |
|---|---|
| Access Interface | ADMs add and drop packet traffic between the N/wk Ring and the Access Interface through the Packet Terminal |
| CM | Connection Map |
| flow | A packet flow, generally a stream of packets that follow the same route through a portion of a network. In a N/wk Ring a flow is the same as a SONET connection formed of virtual-concatenated Paths routed from an ingress Access Interface to an Egress Access Interface of the N/wk Ring. |
| MCC | Master Connection Controller |
| MinTU | Minimum Transfer Unit in the N/wk Ring, M (an integer) consecutive SPEs on certain STS-1 channels in the N/wk Ring, used as a measure of transport capacity as well as in allocation of network resources |
| N/wk | The network formed of N/wk Rings. It is recommended that the N/wk is be made up of a single or multiple hierarchical N/wk Rings. |
| N/wk Ring | A SONET ring connecting the Packet Terminals. Logical, normally two directional ring. |
| over-frame | Period of R (an integer) consecutive SONET frame periods. (SONET frame period is nominally 125 microseconds.) |
| packet | any block of data that has a forwarding identifier in it, such as destination address in IP packets, DLCI in Frame Relay frames, VPI/VCI field in ATM cells or Ethernet address in Ethernet frames etc. |
| Packet Sink | (see also Packet Source) Packet Sinks terminate the virtual-concatenated STS-Xc Paths transporting packets over the N/wk and then send the packets on the egress Access Interface. |
| Packet Source | Packets received from ingress Access Interface are demultiplexed to the appropriate Packet Source buffers. From Packet Source buffers packets are sent to related Packet Sinks over virtual-concatenated STS-Xc Paths. |
| Packet Terminal | Packet Terminal comprises Packet Sources and a Packet Sink. At a Packet Terminal there is a dedicated Packet Source (buffer) for each of the remote Packet Sinks at the N/wk Ring. |
| Path | A SONET path over the N/wk Ring from a Packet Source to a Packet Sink |
| PCC | Peripheral Connection Controller |
| Pkt_Sk | Packet Sink |
| Pkt_So | Packet Source |
| PT | Packet Terminal |
| PTR | Packet Terminal Report |
| SPE | Synchronous Payload Envelope of a SONET frame (VC in SDH) |
| STS-Xc | Virtual concatenation of X STS-1s, to achieve the transport capacity of X STS-1 payloads for the connection. (X is the concatenation coefficient.) |

For basic SDH terminology and definitions, refer to ITU-T Recommendation G.707. Specifically, a key SDH mechanism used here, virtual concatenation, is defined in subclauses 8.1.7 and 8.3.6 of ITU-T Recommendation G.707 (03/96). SONET is a subset of SDH that is used in North America.

FIG. 1 illustrates a SONET ring, N/wk Ring 10, used both as a router and a transport network for packet traffic entering and exiting the N/wk Ring via the Access Interfaces of the PTs that are connected by the SONET ring. Typical applications of that kind of routing transport network could be LAN interconnections, where the LANs would interface with the N/wk Ring via the Access Interfaces. Description of the operation of N/wk Ring 10, and its two major components, PT and MCC, will be provided with reference to FIGS. 2–4.

Figure 2:
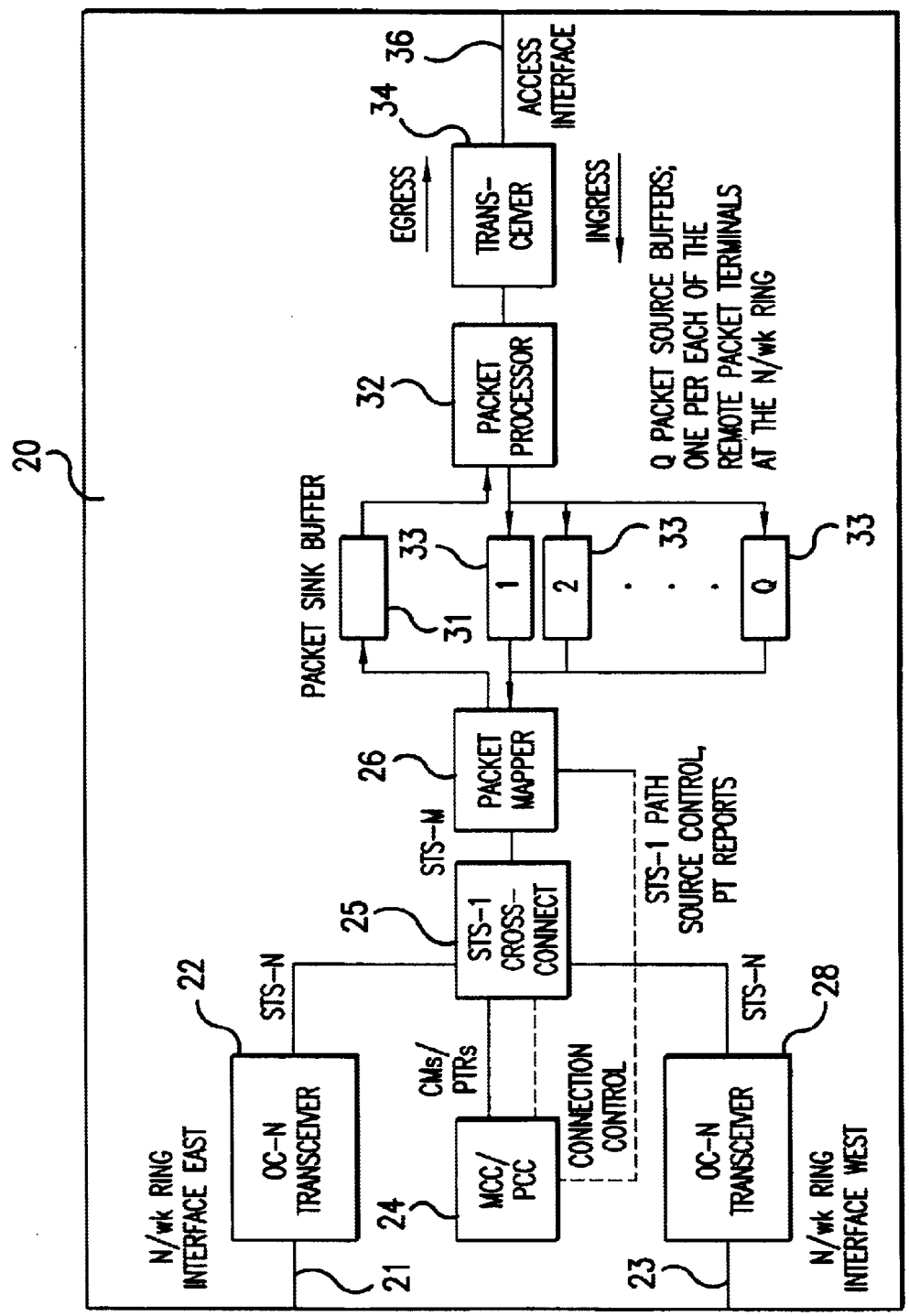
FIG. 2 illustrates a generalized block diagram of a Packet Terminal of FIG. 1.

FIG. 2 illustrates an embodiment of PT 18. Similarly, FIG. 2 also applies to illustrate PT 20, the difference between PT 18 and PT 20 being that PT 20 has an activated MCC, while PT 18 has no activated MCC. Thus, the details provided herein for PT 18 similarly applies also to describe PT 20, with the added description of the activated MCC functions of PT 20 being provided later with reference to FIGS. 3 and 4. Both PT 18 and PT 20 however need to have the PCC functionality. Access Interface 36 provides an external interface of N/wk Ring 10. PT 18 operates as an ADM on the N/wk Ring. Additionally, PT 18 performs de-multiplexing of packets from the ingress Access Interface to the Packet Sources and packet-to-SONET mapping in ingress direction, and SONET-to-packet de-mapping and packet multiplexing to the egress Access Interface in egress direction. Thus, with either PT 18 or PT 20, each PT comprises two sets of interfaces: an access Interface 36 and an N/wk Ring interface comprising an N/wk Ring interface East 21 and an N/wk Ring interface West 23 (see FIG. 2). Each of these interfaces comprises both transmit and receive interface.

Figure 3:
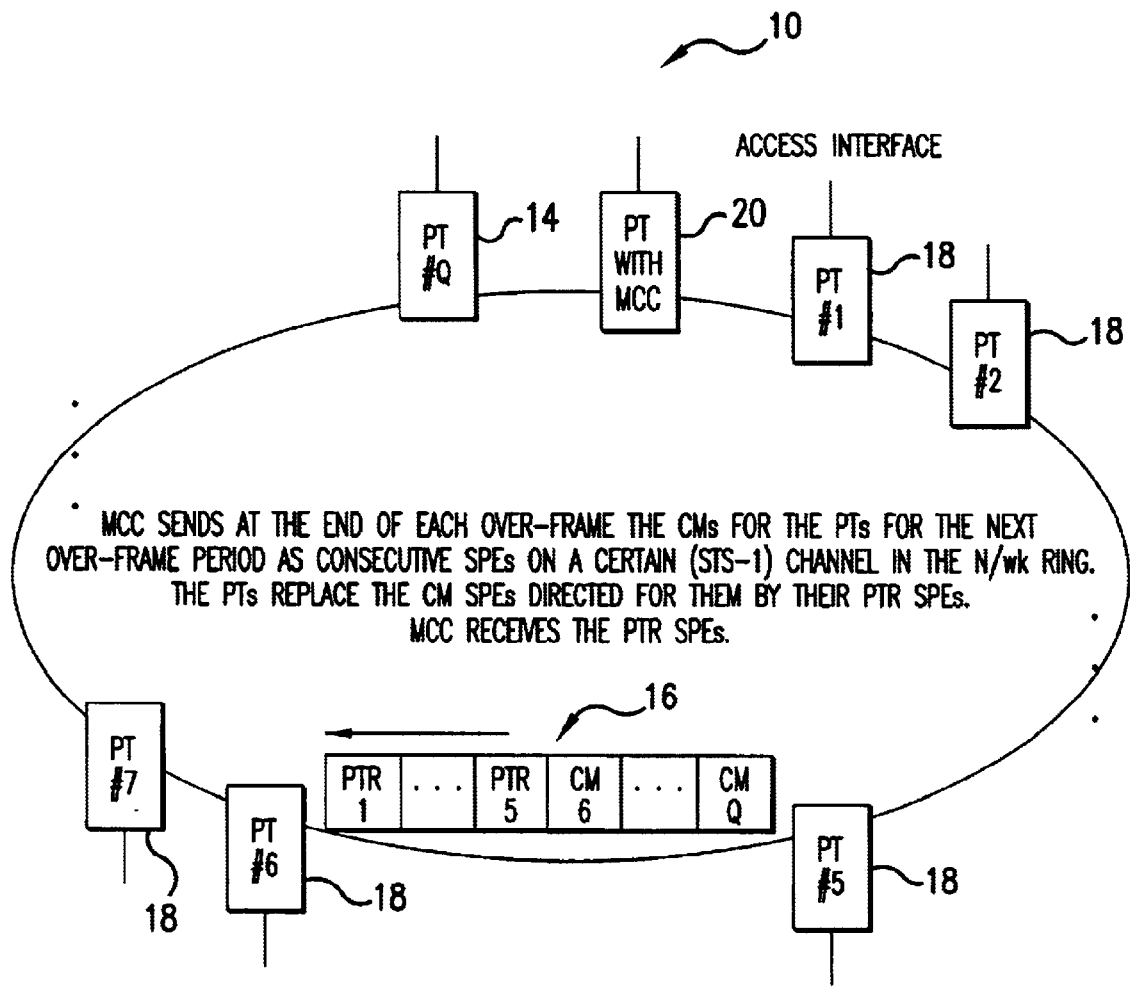
FIG. 3 illustrates the signaling utilized by this invention in a N/wk Ring of FIG. 1.

FIG. 3 illustrates signaling used in the N/wk Ring to periodically
(a) collect the necessary information, such as Packet Source buffer fills, from the PTs of the N/wk Ring to the MCC, for the MCC to compute the operational instructions, such as the STS-1 cross-connection maps, for the PTs,
(b) and to deliver these instructions as generated by the MCC for the PTs of the N/wk Ring.

The messages conveying the (a) information from the PTs to the MCC are called PT Reports (PTRs), and the messages conveying the (b) information from the MCC to the PTs are called (CMs). MCC sends at end of every over-frame period the CMs to the PTs for the next over-frame period as consecutive SPEs 16 on a certain (STS-1) channel in the N/wk Ring. The PTs replace the CM SPEs directed for them with their PTR SPEs. The component at the PTs communicating with the MCC is PCC.

Figure 4:
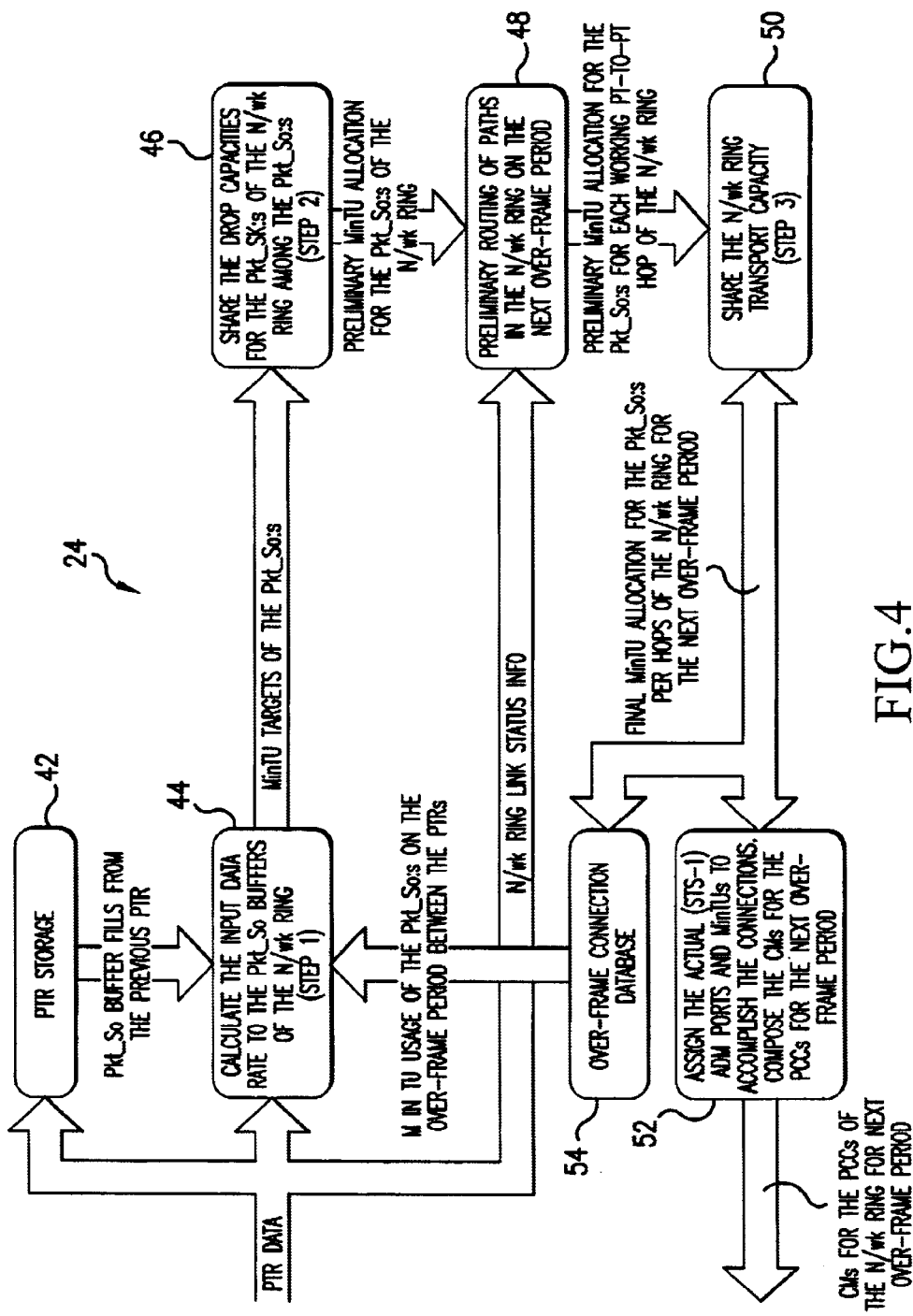
FIG. 4 illustrates a more detailed diagram of the N/wk Ring connection capacity allocation algorithm performed by the Master Connection Controller of FIG. 1 and FIG. 2.

FIG. 4 illustrates the information flow in the algorithm performed by the MCC to allocate connection capacities for the traffic flows of the N/wk Ring. Arrival of a set of the PTRs from the PTs of the N/wk Ring to the MCC launches the algorithm that produces the new set of CMs for the PTs of the N/wk Ring.

Figure 5:
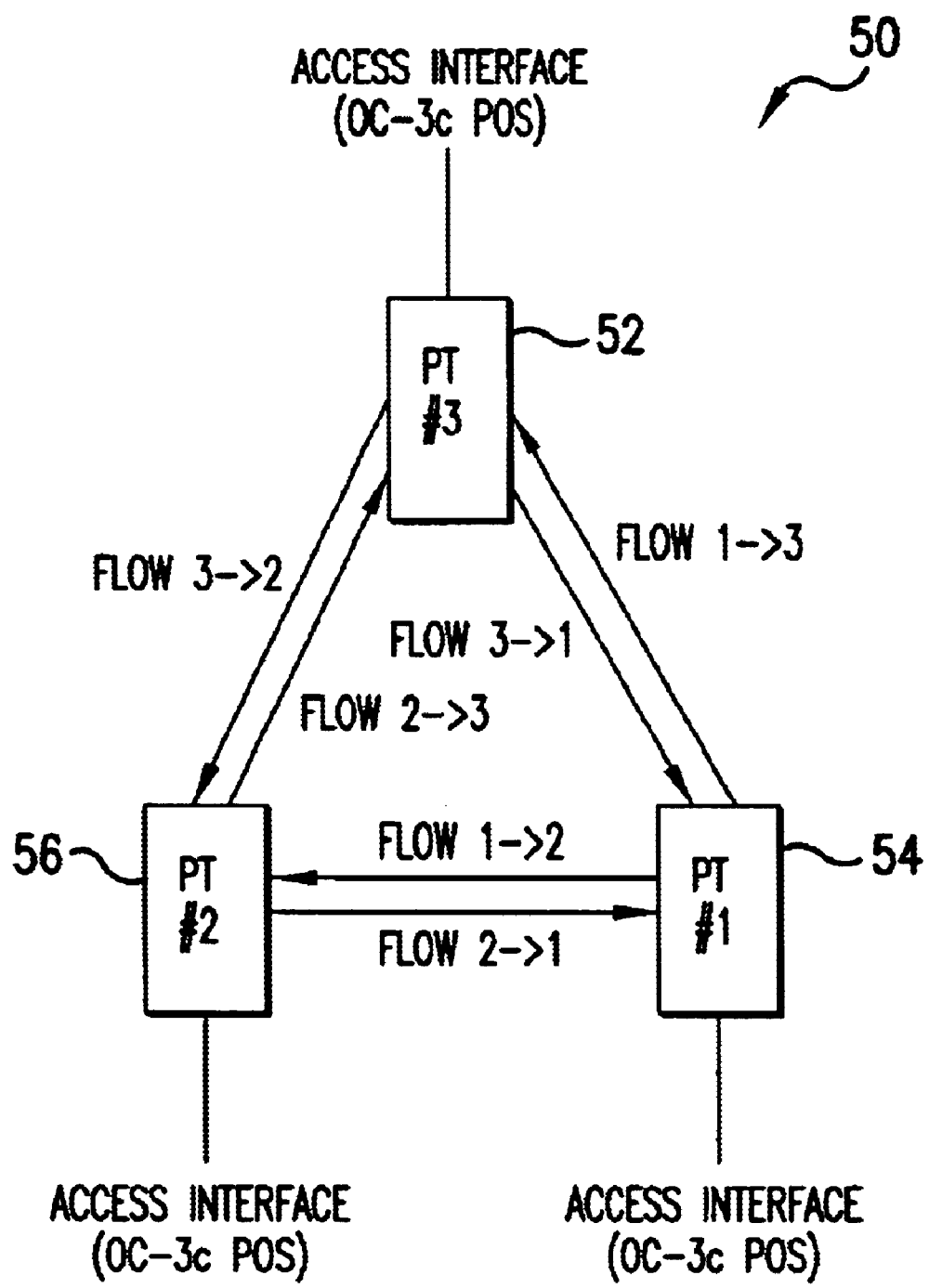
FIG. 5 illustrates the traffic flows in a simplistic N/wk Ring.

FIG. 5 illustrates the packet traffic flows routed in a simple N/wk Ring, which in that figure is a two-directional SONET ring. In general, a flow in a N/wk Ring is an unbroken SONET Path, a connection, from a Packet Source to a Packet Sink, transporting packets through the N/wk Ring from an ingress Access Interface to the correct egress Access Interface. These Paths are pass-through connected at intermediate nodes on the N/wk Ring where they are not added to or dropped from the N/wk Ring.

N/wk Ring Operation Principle

Dynamic adjustment of the capacity of SDH/SONET connections is provided in accordance with the principles of this invention by automatically adding and removing Paths to and from the connections formed of virtual-concatenated Paths based on the actual volumes of the packet traffic flows between the Access Interfaces of the N/wk Ring and fair sharing of network resources.

In its simplest form the invention can be implemented as a group of stand-alone equipment called PTs connected in a logical (two-directional) SONET ring, called N/wk Ring. Context diagram of an example N/wk Ring is shown in FIG. 1. The two major elements of the invention, called the PT, and the MCC, can be identified in FIG. 1. One of the PTs in the N/wk Ring must be a master, with active MCC, while the rest are peripheral equipment (or in such modes). The ring directions can operate independently when both directions are working.

The PTs connected in the N/wk Ring have a built-in SONET connection management that arranges the virtual concatenated STS-Xc connections between the PTs in the N/wk Ring based on the volumes of the packet traffic flows between the Access Interfaces of the N/wk Ring and on fair sharing of N/wk resources when the demand exceeds the supply. The key component in this connection management process is the MCC (FIG. 4).

The elementary techniques (process steps) required to implement the invention, namely, automatic and dynamic adjustment of the capacity of SONET connections within a SONET ring that operates like a single logical router, are:

1. Forming by Packet Processor 32 packet traffic flows based on the N/wk Ring-scope destinations of the packets received from the ingress Access Interface 36.
2. Mapping by Packet Mapper 26 the packets received from the ingress Access Interface 36 to STS-Xc containers on a per-flow basis, and de-mapping the packets transported through the N/wk Ring 10 from STS-Xc containers and forwarding them on the egress Access Interface 36.
3. Measuring in real-time the volumes of each of these traffic flows in the N/wk Ring 10. This is accomplished by performing the following sub-steps once in every over-frame period (over-frame period comprises of R (an integer) consecutive SONET frame periods):

3.1 Transfer the Packet Source buffer fill information from the PTs of the N/wk Ring to the MCC (see PTR delivery in FIG. 3).
3.2 Based on the Packet Source buffer fill reports, MCC 20 computes the volumes of the associated traffic flows (see FIG. 4). (Each Packet Source buffer is the start point of the related flow in the N/wk Ring.)

4. Based on the volumes of the traffic flows and fair sharing of network resources, allocation of the access and transport capacity on the N/wk Ring among the traffic flows, and computing the cross-connect maps (CMs) for the N/wk Ring for the next over-frame period accordingly by the MCC, and delivering the CMs to the PTs of the N/wk Ring (see CM delivery in FIG. 3).
5. Forming and terminating the virtual-concatenated STS-Xc paths and controlling and performing the STS-1 cross-connect by the PTs according to the CMs received from the MCC.

The functions of a PT are not required to be physically located in a single network element. On the other hand, the whole N/wk Ring can be implemented as a single network element. The Access Interfaces can also be interfaces between different N/wk Rings allowing to combine a number of N/wk Rings (hierarchically) so that they appear functionally still as a single router, the N/wk. Each external Access Interface of the N/wk is a (IP) network interface of that logical (IP) router.

Ingress Direction Operation (Traffic Flow From the Access Interface to the N/wk Ring Interfaces of PT)

Access Interface transceiver 34 of each PT device 18 or 20 terminates the physical framing used at the Access Interface 36. Access interface transceiver 34 de-maps the packets from the physical layer frames and passes the packets to Packet Processor 32.

Packet Processor 32 is a logic device that in the ingress direction demultiplexes the packets arrived from the Access Interface to the Packet Source buffers according to the destination/forwarding identifiers of the packets. There is a dedicated Packet Source buffer 33 at a PT for each of the remote PTs on the N/wk Ring 10. Thus a particular Packet Source buffer 33, say the Packet Source buffer #Q of PT #P, collects all the packets arrived from the ingress Access Interface of the PT #P that are to be sent on the egress Access Interface of the PT #Q of the N/wk Ring. There can be a default destination PT at the N/wk Ring. Packet Processor (optionally) demultiplexes such packets accepted from the Access Interface, for whose destination identifiers it does not have a mapping to any particular destination PT, to the Packet Source buffer collecting the packets for that default destination PT.

The packets are encapsulated in HDLC-like (or equivalent) frames when written to the Packet Source buffers. There can be different segments in the Packet Source buffers for different traffic priority classes. The Access Interface transceiver device and the Packet Processor also perform all other typically relevant interface processing for the Access Interface traffic.

Packet Mapper 26 is a logic device that in the ingress direction maps the HDLC-like framed packets from the Packet Source buffers into the payloads of the virtual-concatenated STS-Xc (X=0,1,2, . . . ,N; wherein N is an integer reflecting the access capacity of the PT) connections that are dynamically arranged through the N/wk Ring from the source PT to the destination PTs related to the individual Packet Source buffers of the source PT.

The virtual concatenated STS-Xc connections between the PTs (terminated by Packet Mappers) in the N/wk ring are treated as a group of independent STS-1 Paths by the SONET equipment. The STS-1 Paths between the Packet Mappers and the N/wk Ring, and between the N/wk Ring interfaces of the PT are connected by an STS-1 cross-connect device 25, that is controlled by a logic device called Peripheral Connection Controller (PCC) 24.

Packet Mapper 26 sends sufficiently long fields of stuff bytes (such as HDLC flag bytes) after the beginning and before the end of the Paths to ensure that no customer data is lost at connection changes in the N/wk Ring. Sending (positioning) of these stuff fields is controlled by PCC 24.

Packet Mapper 26 can add N STS-1 Paths through the STS-1 cross-connect 25 to the N/wk Ring. PCC 24 dynamically allocates these N STS-1s among the Packet Sources of the PT. At a PT there is a separate Packet Source for each of the remote PTs on the N/wk Ring, and each of the Packet Sources has its dedicated Packet Source buffer 33. Any division of the N STS-1s among the Packet Sources is possible. The STS-1 Trail Trace Identifier (J1 byte in the STS-1 POH) is used to identify both the source PT and the correct destination PT of the STS-1 Path. Network management SW configures these PT identifiers for each of the Packet Mappers.

Dynamic Connection Modification in the N/wk Ring

PCC 24 controls the STS-1 cross-connections (add-connections from the Packet Mappers, drop-connections to the Packet Mappers and pass-through connections between the N/wk Ring interfaces) and the division of the cross-connection add-capacity of the PT among the Packet Sources of that PT according to the instructions from MCC (located at PT 20). As previously discussed, there is one active MCC in the N/wk Ring, and one PCC for each of the PTs. The active MCC from PT 20 sends instructions to the PCCs 24 on a designated STS-1 channel in the N/wk Ring at the end of every over-frame period, i.e. between every R (an integer) SONET frame periods. The over-frame is divided to S (an integer) stable-connection periods to provide a length corresponding to R/S SONET frame periods. The MCC sends to the PCCs distinct STS-1 cross-connection instructions for each of the stable-connection periods. Each PCC then applies them by configuring the local STS-1 cross-connect and the Packet Mapper accordingly for each stable-connection period.

An active MCC 24 maps the instructions for each of the PCCs in distinct SPEs and sends them as an STS-1 Path on a certain STS-1 channel that the PCCs constantly monitor. The SPEs conveying these instructions are called Connection Map (CM) SPEs. The PCCs recognize these CM SPEs from their J1 bytes. MCC writes both its own ID, and the ID of the PT, to which the particular CM SPE is directed, on the J1 bytes of the CM SPEs. Since the CM SPEs are sent at a constant phase in every over-frame period, the PCCs synchronize their over-frame phase counters to a certain (e.g. the last) CM SPE on that Path. This is how the different STS-1 cross-connects in the N/wk Ring are kept in coherent over-frame phase.

FIG. 3: CM and PTR Delivery in a N/wk Ring

The PCCs 24 replace the CM SPEs directed for them by SPEs that contain information about the Packet Source buffer fill levels and of status of the interfaces of the PT. These SPEs are called PT Report (PTR) SPEs. The CM and PTR delivery in a N/wk Ring is depicted in FIG. 3. MCC receives these PTR SPEs and based on these, and the previous PTRs and CMs, it composes the CMs for the next over-frame period on the N/wk Ring. The algorithm that MCC uses to allocate the (working) resources at the N/wk Ring among the Packet Sources is described by FIG. 4 and the excerpt from the related ASIC specification that follows.

FIG. 4: Conceptual (and Partial) Block Diagram of MCC

The N/wk Ring resource allocation algorithm is divided in the following steps:

1. Compute the input data rate to each Packet Source buffer, and based on those and the most recently reported Packet Source buffer fills themselves, compute the target capacity for each of the Packet Source-Packet Sink traffic flows.
2. Share the drop-capacity among the Packet Sources for each of the Packet Sinks.
3. Check the link-status information from the PT reports, and share the N/wk Ring transport capacity of the working links among the preliminary Source-Sink connections as resulted from Step 2. After this step, all the Source-Sink connections on the N/wk Ring on the next over-frame period are defined.

Step 1: Compute the Target Capacity for Each of the Packet Source-Packet Sink Traffic Flows MCC counts an (approximated) input data rate for each of the Packet Source buffers based on the two most recent reported buffer fills and the MinTU usage by the Packet Sources on the over-frame period between PTRs that carried the two most recent reported buffer fills. Target capacity for a Packet Source-Packet Sink flow (=drop capacity request by a Packet Source for the destination Packet Sink) is the number of MinTUs on an over-frame corresponding to the greater of the following:

1) STS-X/C with capacity closest to the input data rate of the Packet Source buffer. Here X is a non-negative integer and C is the number of stable-connection periods in the over-frame.
2) STS-EF/CD, where STS-E/C (E is a positive integer) is the initial equal share of drop-capacity (as described in Step 2), D (an integer multiple of E) is a certain "maximum delay" limit for Packet Source buffer fills, and F is the Packet Source buffer fill rounded up to the closest integer multiple of D/E, when the buffer fill is below D, and otherwise D.

Step 2: Share the Drop-capacity for the Packet Sinks

Drop-capacity for a Packet Sink is shared according to the following principles:

1. Initially each of the Q Packet Source capable of sending packets to the Sink is assigned 1/Q of the drop-capacity for the next over-frame period. If the output capacity of the Packet Sink is OC-12, and the over-frame is 64 SONET frame periods, divided to stable connection period of 8 frame periods each, then each of the Packet Sources is initially allocated 12 MinTUs (STS-12/8), which can be accomplished for example so that half of the Packet Sources have 2 STS-1s, and the another half has 1 STS-1 during each half of the over-frame period, and the allocation of the STS-1s is switched in the middle of the over-frame period so that each Packet Source gets 12 MinTUs in total on the over-frame period.

2. If there were Packet Sources whose drop-capacity request was smaller than the initial equal division, the declinations of these are accumulated for all Packet Sources, and the thus gotten total amount of 'generally available' drop-capacity is shared between Packet Sources whose drop-capacity request was greater than the initial equal division, if there were such Sources. If the total amount of 'generally available' additional drop-capacity is smaller than or equal to the amount of smallest additional (to the initial 1/Q share) capacity requested by a Source multiplied by the number of Sources requesting more capacity, the unassigned additional drop-capacity is shared equally among the Sources requesting more capacity. Otherwise, each of these Sources gets the amount of additional capacity corresponding to the smallest additional (to the initial 1/Q share) capacity requested by a Source. After that additional share, new figures of additional capacity requests of the Sources and 'generally available' drop-capacity are computed, and the above process of drop-capacity sharing is run again (and again until there is no more unassigned drop-capacity left, or no more requesting Sources).

3. The ties between the Packet Sources can be solved with secondary favor parameters such as favoring the Sources according to their distances (in ADM-to-ADM hops) from the Sink, the fill levels of the Packet Source buffers, and shifting favor-parameter method.

Step 3: Share the N/wk Ring Transport Capacity

There may not be enough transport capacity in the N/wk Ring to route all the Paths as based on Packet Sink drop-capacity sharing. If that is the case, a second algorithm is needed to run to share the N/wk Ring transport capacity. For the purpose of transport capacity sharing, the preliminary allocated MinTUs (as resulted from Step 2) are classified in one of the two categories: 1) the MinTUs that were (preliminarily) allocated to match the capacity request by the related Packet Source, and 2) the rest of the (preliminarily) allocated MinTUs. Transport capacity sharing is based on the principles that the MinTUs of the category 2) are eliminated first, if required by the limited transport capacity, and the individual Paths are disfavored based on the PT from which they originate. The PT that is assigned (at the moment of transport capacity sharing) most MinTUs in whole, will be the first to lose a MinTU. The transport capacity sharing and MinTU allocation for the Packet Sources is finished when all the Paths corresponding to the allocated MinTUs can be routed in the N/wk Ring on the over-frame period.

The transport capacity sharing could be started from the most over-booked PT-to-PT hop. After the traffic volumes are adjusted to fit in the capacity of the initially most over-booked PT-to-PT hop, the Path map of the N/wk Ring on the next over-frame is updated accordingly, and based on the updated Path map, a new most over-booked PT-to-PT hop in the N/wk Ring is sought, and so on until there is no more over-booked PT-to-PT hops.

Traffic is routed using only working links (PT-to-PT hops or Access Interfaces). Therefore, the PTs attach the necessary link status information (including the status of the Access Interfaces as well as the PT-to-PT hops in the N/wk Ring) in the PTRs. In two-directional N/wk Ring there is two possible routes between any pair of PTs. The shorter route is default one. In case of link failure along the default route, or (optionally) in case that the transport capacity required by the related input data rate can be better matched on the alternative route, the alternative route is used. No N/wk Ring capacity is used for traffic towards a non-working egress Access Interface.

MCC composes independent CM for each of the ring directions, and can monitor PTRs from both ring directions. The difference in PT reports arrived from different ring directions should be due to the difference in the time those reports were composed. MCC performs the allocation of N/wk Ring resources for the Packet Sources for both of the traffic directions at once, and then composes two sets of CMs; one set for each of the traffic directions.

An Example of Resource Allocation in a Simple N/wk Ring

A simplistic example is presented here to illustrate the allocation of drop-capacity of Packet Sinks of a N/wk Ring connecting three PTs. The PTs are named as PT #1, PT #2 and PT #3. Any of these PTs can be the PT with (active) MCC. The packet flows in that simple N/wk Ring are depicted in FIG. 5 below. The throughput of each of the PTs and the transmission capacity on the N/wk Ring in this example is 24 MinTUs per an over-frame period (8 ms), and one MinTU is 6 kbytes. In practice, a MinTU close to 6 kbytes could be accomplished for example by an STS-1 Path that is allocated for 1 ms for a flow on an over-frame-period. The STS-1 payload size is 756 bytes and SONET frame period is 0.125 ms. A PT throughput of 24 MinTU (144 kbyte) per an over-frame period of 8 ms could correspond to an OC-3c POS Access Interface.

FIG. 5 illustrates the flows in a simple N/wk Ring connecting three PTs. The flows are routed on a two-directional SONET ring. In general, a flow in a N/wk Ring is an unbroken SONET Path from a Packet Source to a Packet Sink, transporting packets through the N/wk Ring from an ingress Access Interface to the correct egress Access Interface. These Paths are pass-through connected at intermediate nodes on the N/wk Ring where they are not added to or dropped from the N/wk Ring. A two-directional N/wk Ring with only three PTs is a special case where all the flows (when all the ring segments are working) are single-hop i.e. from the originating PT to the next PT. This is also a special case where there is no contest of transport capacity if the N/wk Ring capacity is the same (in both directions) as the capacity of the Access Interfaces (OC-3 in this example).

Table 1 shows a possible start-up of the example N/wk Ring. The following abbreviations are used in the table:

Flow X-→Y Packet flow from PT #X to PT #Y on the N/wk Ring. In this example {X, Y}={1, 2, 3}, as shown in FIG. 5.

Fill_X_Y Fill of Packet Source buffer #Y of the PT #X (see FIG. 2) in kbytes at the end of the previous over-frame period IR Input rate (kbytes/over-frame period) to the Packet Source buffer originating the flow. MCC counts IR using the equation:

$IR = \text{Fill\_}X\_Y(t) - \text{Fill\_}X\_Y(t-64\ ms) + OR$

This is a part of Step 1 of the MCC algorithm presented with reference to FIG. 4. The symbol t is time and the symbol OR is explained below, and for the computation of IR it is retrieved from the over-frame connection database as presented in FIG. 4.

RQ_IR Transport capacity request by the Packet Source in MinTUs based on the IR of the previous over-frame period. This is IR of the previous over-frame period rounded to closest integer multiple of MinTUs, which is 6 kbytes in this example.

EF/D Amount of data transmitted by STS-EF/CD during an overframe in units of MinTU. STS-1/C (STS-1/8 here) is the MinTU, approximated as 6 kbytes, and the amount of data transmitted by STS-EF/CD is EF/D times the amount transmitted by STS-1/C. In this example, STS-E/C=STS-12/8, D=72 kbytes and F is Fill_X_Y rounded to the next integer multiple of D/E i.e. to the next integer multiple of 6 kbytes, in case Fill_X_Y is less than D, and otherwise D. For more comprehensive explanation, see Steps 1 and 2 of the description of the MCC algorithm described previously.

RQ Transmission capacity request by the Packet Source in MinTUs. This is an output of Step 1 and an input for Step 2 of the MCC algorithm as presented in with reference to FIG. 4.

Cap Transmission capacity in MinTUs for the flow on the N/wk Ring on the over-frame period. This is a result of Step 2 as presented with reference to FIG. 4. In this example, because all the links are assumed to be working, and because there is no contest of transport capacity and because all the flows are single-hop, this is also a result of Step 3 of the MCC algorithm.

OR Output rate (kbytes/over-frame period) of the Packet Source buffer originating the flow, Cap multiplied by the MinTU. If the Packet Source buffer is empty, stuff bytes are sent instead of data from the buffer.

Table 1 provides an example of MinTU allocation for the Packet Sources of a N/wk Ring connecting three PTs. At any over-frame period, not the sum of the IR figures of the flows originating from the same PT, nor the Cap figures of the flows transporting data to the same PT, can exceed the throughput of the PT. The greater of the figures of RQ_IR and EF/D is taken as the RQ by the related Packet Source for the over-frame period.

Egress Direction Operation (Traffic Flow From the N/wk Ring Interfaces to the Access Interface of PT)

Packet Mapper monitors the J1 bytes of the Paths dropped for it from the STS-1 cross-connect. The J1 bytes identify both the source and the correct destination PT of the Path. Paths with matching destination identification are associated in their concatenation groups with their concatenation order, and the virtual-concatenated payloads are recovered. All the Paths between any two PTs belong to the same concatenation group. A Path added to or removed from a certain concatenation group is always the Path with highest concatenation order in that concatenation group. The concatenation order of a Path can also be explicitly indicated (and monitored) using certain unassigned Path overhead bits.

TABLE 1

An Example of N/Wk Ring Start-Up

|  |  | 0 ms | 8 ms | 16 ms | 24 ms | 32 ms | 40 ms | ... |
|---|---|---|---|---|---|---|---|---|
| Flow 1->2 | Fill_1_2 | 0 | 0 | 28 | 0 | 2 | 0 | |
|  | IR | 10 | 100 | 50 | 50 | 50 | 50 | |
|  | RQ_IR | 0 | 2 | 17 | 8 | 8 | 8 | |
|  | EF/D | 0 | 0 | 5 | 0 | 0 | 0 | |
|  | RQ | 0 | 2 | 17 | 8 | 8 | 8 | |
|  | Cap | 12 | 12 | 12 | 8 | 12 | 8 | |
|  | OR | 72 | 72 | 72 | 48 | 72 | 48 | |
| Flow 3->2 | Fill_3_2 | 0 | 0 | 48 | 116 | 80 | 108 | |
|  | IR | 20 | 120 | 140 | 60 | 100 | 90 | |
|  | RQ_IR | 0 | 3 | 20 | 23 | 10 | 17 | |
|  | EF/D | 0 | 0 | 8 | 12 | 12 | 12 | |
|  | RQ | 0 | 3 | 20 | 23 | 12 | 17 | |
|  | Cap | 12 | 12 | 12 | 16 | 12 | 16 | |
|  | OR | 72 | 72 | 72 | 96 | 72 | 96 | |
| Flow 1->3 | Fill_1_3 | 0 | 58 | 26 | 0 | 18 | 18 | |
|  | IR | 130 | 40 | 0 | 90 | 90 | 90 | |
|  | RQ_IR | 0 | 22 | 7 | 0 | 15 | 15 | |
|  | EF/D | 0 | 10 | 4 | 0 | 3 | 3 | |
|  | RQ | 0 | 22 | 7 | 0 | 15 | 15 | |
|  | Cap | 12 | 12 | 12 | 12 | 15 | 15 | |
|  | OR | 72 | 72 | 72 | 72 | 90 | 90 | |
| Flow 2->3 | Fill_2_3 | 0 | 28 | 0 | 0 | 0 | 0 | |
|  | IR | 100 | 0 | 0 | 10 | 10 | 10 | |
|  | RQ_IR | 0 | 12 | 0 | 0 | 2 | 2 | |
|  | EF/D | 0 | 5 | 0 | 0 | 0 | 0 | |
|  | RQ | 0 | 12 | 0 | 0 | 2 | 2 | |
|  | Cap | 12 | 12 | 12 | 12 | 9 | 9 | |
|  | OR | 72 | 72 | 72 | 72 | 54 | 54 | |
| Flow 2->1 | Fill_2_1 | 0 | 0 | 68 | 76 | 68 | 66 | |
|  | IR | 40 | 140 | 140 | 130 | 130 | 130 | |
|  | RQ_IR | 0 | 7 | 23 | 23 | 22 | 22 | |
|  | EF/D | 0 | 0 | 11 | 13 | 11 | 11 | |
|  | RQ | 0 | 7 | 23 | 23 | 22 | 22 | |
|  | Cap | 12 | 12 | 22 | 23 | 22 | 22 | |
|  | OR | 72 | 72 | 132 | 138 | 132 | 132 | |
| Flow 3->1 | Fill_3_1 | 0 | 0 | 0 | 0 | 4 | 2 | |
|  | IR | 5 | 10 | 0 | 10 | 10 | 10 | |
|  | RQ_IR | 0 | 1 | 2 | 0 | 2 | 2 | |
|  | EF/D | 0 | 0 | 0 | 0 | 1 | 0 | |
|  | RQ | 0 | 1 | 2 | 0 | 2 | 2 | |
|  | Cap | 12 | 12 | 2 | 0 | 2 | 2 | |
|  | OR | 72 | 72 | 12 | 6 | 12 | 12 | |

Packet Mapper writes the HDLC-like framed packets extracted from the received concatenated payloads to the Packet Sink buffer.

Packet Processor passes the HDLC-like framed packets from the Packet Sink buffer to the Access Interface transceiver and performs the processing related to that interface. Finally the packets are forwarded on the egress Access Interface, thus exiting the N/wk Ring.

MCC and Access Interface Protection Switching Mechanisms

The protection mechanisms presented in this chapter are not necessary for the operation of the presented method. However, by implementing these protection mechanisms with the network concept based on the presented method, certain improvements in traffic re-routing performance can be achieved compared to the mechanisms currently used in IP routing, which are based on reachable network address advertisements between routers via Routing Information Protocols.

MCC Protection

It is possible to have a protecting (stand-by) MCC in the N/wk Ring. SW selects whether an MCC operates in working or stand-by mode. After SW has configured MCC from stand-by mode (reset state) to working mode, MCC should right away send default (flat division) CMs in both directions of the N/wk Ring.

Also more automated MCC switchover scheme can be chosen. For example, to automate the switchover, the MCC in stand-by mode could monitor the STS-1 channel that should carry the CMs. The CM SPEs can be detected by monitoring the J1 bytes; sender MCC writes its ID on the lower nibble of the J1 bytes of the CM SPEs. A stand-by MCC could automatically switch into active mode if it has not detected CMs on the relevant STS-1 channel for N (SW configurable in the range of 1 . . . 16) over-frames, while the transmit and receive ring interfaces, and the up-link interface if applicable, of the ADM where it is located, are working.

Note that in case of failure on the ADM where the active MCC is located, the STS-1 connections in the N/wk Ring remain as they were on the last stable-connection period of the last over-frame for which the working MCC was able to provide the CMs. After such failure, there will probably be an Unequipped or an Alarm Indication Signal on the STS-1 channel that is used to carry the CM Paths, as the CM Path would have been sent on the last stable-connection period of the over-frame. The protecting MCC can send the default CMs on that same STS-1 channel (in both directions) in any phase w.r.t. the previous over-frame, as the ADMs will synchronize their over-frame phases to any arrived CMs. The MCC at the failed node (or a node with a failed ring interface) should automatically switch in to stand-by mode. The active/stand-by configurations of the MCCs of a N/wk Ring should be non-revertive.

Up-link Protection

There can also be working and protecting (stand-by) default destination PTs at the N/wk Ring. In case that traffic cannot be routed via the primary default PT, the protecting default PT is switched as the working one. The Access Interface of the default PT of a N/wk Ring is called the up-link of the N/wk Ring.

N/wk Ring should be able to re-route the Paths to/from the protecting default PT in case of failure at the primary up-link of the N/wk Ring. A simple solution could be that as also the PT with MCC should be protected, the up-link PTs are also the PTs with MCCs. The working default (up-link) PT is also the PT with MCC in active mode. Since the active/stand-by MCC switchover is an automatic (HW) process (if enabled by SW), so is the working/protecting default PT switchover. Thus MCCs do not need to explicitly take care of up-link protection switching and related Path re-routing.

Access Interface Protection

Consider a case where a certain subscriber site can send and receive packets via two PTs of a N/wk Ring, and one of these two PTs is along the subscribers primary Internet access route, while the other PT is along the protection route. The traffic sent from the subscriber site is routed via the protection route whenever the primary route is down, and that does not require any special arrangements at the N/wk. To speed up traffic re-routing in case that a certain egress Access Interface is down, a mapping to the protecting destination PT (besides the primary one) can be configured for the Packet Processors for such destination (subscriber site) addresses that can receive packet via two PTs.

Since MCC periodically, i.e., once in each over-frame period, gathers the PT reports that include also the link status information of the Access Interfaces 36, MCC can send in the CM SPEs also notifications for the Packet Processors 32 about the status of the egress Access Interfaces 36 of the N/wk Ring. After receiving from the MCC a notification that the egress Access Interface 36 of a certain PT of the N/wk Ring is down, Packet Processor de-multiplexes packets, that would normally be forwarded towards that failed Access Interface, to the Packet Source buffers related to the protecting PTs, if such are configured for the destination addresses of those packets.

Protection Performance

It should be noted that all these protection re-routing processes take place within 50 ms from the declaration of a network facility failure, whereas (Layer 3) route convergence based on routing information propagation may take seconds.

Advantages of the Invention

The described invention brings the following advantages for the applications of carrying packet traffic over transport networks:

1. Enhanced bandwidth efficiency and network throughput compared to conventional solutions that route packet traffic via Layer 1 (e.g. SONET) connections between the ingress and egress interfaces of TDM-based networks.

With the presented method essentially no more bandwidth is used (reserved) by a connection than what is the actual (momentary, down to 1 ms time-scale) capacity requirement, or fair-share in case of contention, for the connection. Moreover, the connections are dynamically allocated as much of the available capacity as needed. With traditional solutions using Layer 1 connection based routing, the connections and their capacities are manually configured, i.e. non-dynamic.

In addition, there is no need for dedicated protection bandwidth with the presented method. The presented method is to use a two-directional logical ring topology, where there are two possible routes between each pair of ring access interfaces. Link status information is gathered between regular intervals (in the range of milliseconds) on the ring, and the traffic flows are routed along the optimal routes. With traditional approaches to provide traffic protection, half of the (ring) bandwidth is reserved for protection traffic.

2. Transparency and Lower Overhead for IP Traffic Compared to IP Over ATM

A conventional method for providing variable bandwidth and perform statistical multiplexing and line rate switching of packet-based traffic in SDH/SONET environment is to use ATM over SDH/SONET. ATM however is connection-oriented protocol that requires the connections to established before traffic can be served, making it non-transparent for applications communicating over IP. ATM requires also dedicated equipment and resources for segmentation and reassembly, ATM switching, processing and management, complicating the networks, and causes additional overhead degrading network throughput. With the presented method, the packet traffic flows between the access interfaces of the SDH/SONET rings are routed as bandwidth-optimized SDH/SONET connections, removing the need for ATM.

3. Better Throughput Compared to IP Router Rings in Case of Network Congestion

With the presented method, the traffic flow routing is optimized in the scope of the whole ring. The congestion avoidance is performed in the ingress access interfaces of the ring, thus ensuring that congestion never occurs within the ring. Traditional IP routers can only make routing decisions independently, which may cause certain routers in a ring to become congested and thus cause packet discarding from the traffic in the ring. Packet discarding usually causes retransmissions and thus wastes ring bandwidth i.e. degrades network throughput. It is better the earlier en route the traffic flows that would cause a congestion are shaped to their actual throughput capacity, to achieve better over-all network throughput. Therefore it is optimal if the traffic shaping is done at a network at its ingress access interfaces only, as is the case with the presented method.

4. Lowered Delay

With the presented method the traffic flows from the ingress access interfaces to egress access interfaces of the SDH/SONET rings are transported as optimal SDH/SONET connections, i.e., are pass-through connected as regular SDH/SONET paths at the intermediate ADMs in the ring. In traditional cell/frame/packet over SDH/SONET (POS) solutions, each network element having related access interface needs to packet-wise process and route its whole POS input capacity, delaying also the passing-through traffic.

5. Enhanced Scalability

With the presented method, the ADMs in the SDH/SONET ring having packet-based access interfaces only need to packet-wise process the traffic on these access interfaces, instead of having to packet-wise process the packet traffic worth their total packet-based interface capacity. The access interface capacity of ADMs at backbone SDH/SONET rings is usually from $\frac{1}{16}$ to $\frac{1}{4}$ of the ring capacity. While the typical relative add/drop factor of the total ring traffic in SDH/SONET ADMs may remain in the range of $\frac{1}{16}$ to $\frac{1}{4}$ as the ring capacities grow, the absolute amount of pass-through traffic will probably grow (at least) linearly with the capacity of SDH/SONET rings. Thus the efficiency of the presented SDH/SONET connection (channel) based integrated transport and routing method compared to conventional arrangements becomes even more clear as the transmission rates increase.

A number of N/wk Rings can be connected by a higher-level N/wk Ring to scale-up the capacity and the number of Access Interfaces of the thus formed logical router, the N/wk. Each N/wk Ring in the N/wk operates in an autonomous fashion, supporting scalability. The only difference between the N/wk Rings at different hierarchical levels of the N/wk is that generally the capacity grows with the level of hierarchy. This "pyramid of hierarchical N/wk Rings" topology retains its scalability to unlimited number of hierarchy levels.

Packet routing is also much simpler in case where all the packets either arrive from a single input port or are forwarded towards a single output port. This is the case with the presented method. Also the required SDH/SONET cross-connection capacity is higher at ADMs that need to packet-wise process and route their total packet-based input capacity, since such ADMs need to add and drop traffic between the ring and the packet switch, and usually also between the packet-based access interfaces and the packet switch.

For these reasons it is easier to build high-speed packet traffic transport and routing network elements and networks with the method presented in this document than with traditional approaches.

6. Advantages Over Star Topology Router Network

Though the network concept presented in this document uses logical ring topology, the network based on the concept is logically a single router. Therefore, similar functionality could be provided in principle by a single physical router in a star-topology network. The concept presented in this document has however the following advantages over the star topology router network:

6.1 More Cost-efficient Protection Mechanism

With the presented scheme, a node (PT) failure disables only the only access interface of that node, whereas a failure of the router in a star-topology network disables the whole network. In the star topology, there must be two routers and each served LAN (or host) must have a connection to both of them to provide traffic protection against failure o f one of the routers. With the scheme presented here, the served LANs don't need connections to different networks, but can have connections to two nodes (PTs) on the same ring to protect their network access.

6.2 Less Cabling

The star topology requires $N/\pi$ times the cabling required in ring topology to connect N nodes (routers), assuming straight connections in star topology and circle-shaped two-directional ring, Also the protecting connections i n the star topology are assumed to be longer since the distance between the protecting routers is assumed to be longer than the distance between two nodes (PTs) in the same ring.

6.3 Shorter Average Transmission Delays

Because of t he shorter average cabling distance between two nodes in a ring than between two nodes in a star topology network connecting equal number of nodes located on equal distances from the central point of the network, the average transmission delay is shorter in ring than in star topology network.

7. Reduced Need of IP Network Addresses

The N/wk internal Access Interfaces, i.e. the interfaces between the N/wk Rings that form the N/wk, have no IP addresses. (The N/wk, formed of a single or multiple hierarchical N/wk Rings, is a single logical router that has IP addresses only at its external Access Interfaces.) With traditional approaches, each link between two routers is distinct IP network and requires its own IP network address. That is a problem since IPv4 address space is being exhausted. The reduced need for IP network addresses achieved by the network concept presented in this document also reduces the sizes and the bandwidth required by routing information propagation messages, which routers use to advertise reachable destination networks.

8. Faster Re-routing (Route Convergence) in Case of a Network Facility Failure

A node or link failure within the N/wk or on its Access Interfaces does not require a higher-level protocol to change forwarding tables of the PTs. Thereby the problems with slow convergence of routes in a traditional router network are avoided with the network concept described in this document. Protection switching in case of node or link failure can be handled by the MCC and the Packet Processors automatically re-routing the traffic in less than 50 ms, without the higher protocol layers (like EP in the Layer 3) having to be notified.

In current router (inter) networks, traffic re-routing has to happen via routing information propagation messages and consequent routing table changes, and thus the process of re-routing traffic via a detour takes usually seconds, which is unacceptable for delay sensitive traffic. In addition, a large amount of data is lost in case of node or link failure if there is no built-in automatic protection switching mechanism implemented in the network itself.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks. Other variations and embodiments are possible in light of above teachings, and it is thus intended that the scope of invention not be limited by this Detailed Description, but rather by Claims following.

What is claimed is:

1. A dynamic integrated router and transport network system comprising:

a logical SDH ring, the SDH ring comprising a set of access interfaces, the set of access interfaces corresponding to a set of network interfaces of a logical router, wherein a connection can be dynamically formed uni-directionally between a pair of access interfaces;

a set of connections, with each connection having an associated capacity, wherein the network system dynamically adapts the capacity associated with each connection to a inbound volume of a packet flow routed via the connection between a pair of access interfaces of the SDH ring;

a plurality of packet terminals coupled by the SDH ring, each of the plurality of packet terminals comprising one or more access interfaces and one or more SDH ring interfaces for transceiving the plurality of packet flows between the other packet terminals coupled with the SDH ring, the set of access interfaces of the plurality of packet terminals coupled with the SDH ring serving as the access interfaces of the SDH ring, and wherein there is one active master connection controller controlling the packet terminals coupled with the SDH ring;

wherein the active master connection controller periodically receives a set of packet terminal reports, one report from each of the packet terminals on the SDH ring, the reports indicating the inbound volumes associated with the plurality of packet flows routed over the SDH ring between the access interfaces of the packet terminals on the SDH ring, and in response thereto, the active master connection controller provides a set of connection map instructions to the packet terminals on the SDH ring for dynamically adapting the capacity of each of the connections in the SDH ring to the actual volumes of the packet flows associated with the connections.

2. The dynamic integrated router and transport network system of claim 1 wherein each of the plurality of packet terminals further comprises:

a packet processor, the packet processor coupled to the access interface transceiver of the packet terminal in the ingress direction to demultiplex each packet accepted from the ingress access interface to one or more of packet source buffers coupled to the packet processor based on a destination identifier associated with each packet, and in the egress direction to pass packets from the packet sink buffer to the access interface transmitter;

a packet mapper, the packet mapper in the ingress direction to map the packets from each of the packet source buffers of the packet terminal into virtual-concatenated SDH containers, a single dedicated virtual-concatenation group of SDH paths and associated containers being arranged for each individual packet source, and the packets mapped in the containers being transmitted over associated SDH connections to the destination packet terminals on the SDH ring associated with the individual packet sources, and in the egress direction to de-map the packets, which are transported through the SDH ring along virtual concatenated SDH paths, from the virtual-concatenated containers to the packet sink buffer;

a SDH path cross-connect device coupled between the packet mapper and the SDH ring interface transceivers of the packet terminal, the SDH path cross-connect provides the SDH path add-connections from the packet mapper to the of SDH ring interfaces, drop-connections from the SDH ring interfaces to the packet mapper, and pass-through connections of paths between the SDH ring interfaces of the packet terminal; and a peripheral connection controller for controlling the set of connections formed of the groups of virtual concatenated SDH paths transporting packets between the packet terminals on the SDH ring according to the connection map instructions periodically received from the active master connection controller of the SDH ring.

3. The dynamic integrated router and transport network system of claim 1 wherein each of the packet terminals further comprises:

means for the peripheral connection controller to control the SDH path cross-connect add-capacity allocation among the virtual-concatenation groups, each of the groups being associated with an individual packet source of the packet terminal, by controlling the connection of SDH paths at the packet mapper from the packet source buffers to the cross-connect, and the cross-connections performed by the cross-connect device, according to the connection map instructions, which the peripheral connection controller periodically receives from the master connection controller of the SDH ring, to accomplish the dynamic capacity allocation for SDH connections.

4. The dynamic integrated router and transport network system of claim 1 wherein:

the active master connection controller sends a set of instructions, called connection maps, to the peripheral connection controllers of the packet terminals of the SDH ring on a certain channel on the SDH ring at the end of every over-frame period; and wherein each peripheral connection controller replaces the SDH virtual containers carrying connection maps directed to them with SDH virtual containers carrying packet terminal reports associated with the packet terminal which the peripheral connection controller controls; and wherein the master connection controller maps the connection maps for each of the peripheral connection controllers into a set of distinct SDH containers and sends the set of containers as an SDH path on a certain channel, which is constantly monitored by the peripheral connection controllers, on the SDH ring; and wherein the master connection controller writes both its own identification bit pattern and that of the packet terminal to which a particular connection map is directed to on a certain, e.g. J1, path overhead byte of the SDH virtual containers on the SDH path carrying the connection maps; and wherein the peripheral connection controllers recognize the set of SDH containers carrying the connection maps by monitoring the specified, e.g. J1, path overhead bytes on the channel used for connection map delivery on the SDH ring, and store the connection maps directed to them, and replace the associated virtual containers by virtual containers that carry the packet terminal reports, and that have both the identification bit pattern configured for the packet terminal controlled by the peripheral connection controller and the identification of the master connection controller on the specified, e.g. J1, path overhead byte; and wherein the master connection controller recognizes the set of SDH virtual containers carrying the packet terminal reports by monitoring the specified, e.g. J1, path overhead bytes on the channel used for connection map and packet terminal report interchange on the SDH ring, and stores the packet terminal reports it receives; and wherein since the master connection controller sends the connection maps at a constant phase in every over-frame period, and since each of the peripheral connection controllers synchronizes its associated over-frame phase counter to a certain, e.g. the last, virtual container on the SDH path carries the connection maps, all the cross-connects of the individual packet terminals on the SDH ring are kept in a mutual synchrony.

5. A dynamic integrated routing and transport networking method implemented on an SDH ring, wherein the SDH ring comprises a set of access interfaces, each access interface comprising an ingress direction interface and an egress direction interface, the set of access interfaces corresponding to a set of network interfaces of a logical router, wherein a connection can be dynamically formed uni-directionally between any pair of the set of access interfaces of the SDH ring, the SDH ring coupling a plurality of packet terminals, each of the plurality of packet terminals comprising one or more access interfaces and one or more SDH ring interfaces for transceiving the set of packet flows between the other packet terminals coupled with the SDH ring, the set of access interfaces of the plurality of packet terminals coupled with the SDH ring serving as the access interfaces of the SDH ring, and wherein there is one active master connection controller controlling the packet terminals coupled with the SDH ring, the method comprising:

receiving via the ingress access interface of a packet terminal a sequence of packets;

forming at each of the packet terminals by an associated packet processor the set of packet flows by de-multiplexing by the packet processor each packet accepted from the ingress access interface to one or more of a set of packet sources of the packet terminal based on a SDH ring-scope destinations of the packets received from the ingress access interface, wherein each packet flow starts from one of the packet sources, wherein each packet source comprises a packet source buffer;

mapping by a packet mapper the sequence of packets from the packet source buffers of the packet terminal to a set of virtual-concatenated SDH containers on a per-flow basis, and de-mapping by the packet mapper the packets transported through the SDH ring from the virtual-concatenated SDH containers to a packet sink buffer associated with each packet terminal and forwarding the packets onto the egress access interface;

measuring in real-time the inbound traffic volume of each individual packet flow in the SDH ring, the packet flows being formed at each of the packet terminals on the SDH ring;

based on the volumes of the packet flows and fair sharing of a set of resources of the SDH ring, allocating the SDH ring transport and access capacity among the packet flows between the packet terminals of the SDH ring, and thereupon computing a set of connection maps for a subsequent over-frame period by the master connection controller, wherein a dedicated connection map is generated for each individual packet terminal of the SDH ring, and delivering the composed connection maps to the packet terminals of the SDH ring; and forming and terminating at each packet terminal a set of virtual-concatenated SDH paths and controlling and performing a set of SDH path cross-connections according to the set of connection maps as provided by the active master connection controller of the SDH ring.

6. The dynamic integrated routing and transport networking method of claim 5 wherein the step of measuring in real-time the volume of each individual packet traffic flow in the SDH ring further comprises the periodically executed steps of reporting the packet source buffer fills by each of the packet terminals on the SDH ring to the active master connection controller; and in response to receiving the packet source buffer fill reports, the active master connection controller of the SDH ring computing the inbound traffic volume of each individual packet flow in the SDH ring, wherein each flow is routed through the SDH ring as an SDH connection transporting packets from its associated packet source buffer to the packet sink associated with that packet source.

7. The dynamic integrated routing and transport networking method of claim 5 wherein the communication between the master connection controller and the packet terminals of the SDH ring further comprises the steps of:

for each over frame period, each of the set of packet terminals in the SDH ring provides their packet terminal reports to the active master connection controller, an packet terminal report comprising packet source buffer fill information of the set of packet sources on that packet terminal and optionally also link status information of the interfaces of that packet terminal; and wherein based on the received set of packet terminal reports from the packet terminals of the SDH ring, the active master connection controller generating and transmitting the connection maps for each of the packet terminals on the SDH ring for the next over-frame period.

8. The dynamic integrated router and transport network system of claim 1 wherein one or more of the access interfaces of the SDH ring are coupled to another SDH rings to form a hierarchy of logical SDH rings, where the network thus formed of the hierarchical SDH rings, each SDH ring coupling their own set of packet terminals, still is logically a single router.

9. The dynamic integrated router and transport network system of claim 1 further comprising means for master connection controller protection.

10. The dynamic integrated router and transport network system of claim 1 further comprising means for access interface protection optionally implemented for one more of the packet terminals of the SDH ring.

* * * * *